(12) United States Patent
Takahashi et al.

(10) Patent No.: US 11,110,837 B2
(45) Date of Patent: Sep. 7, 2021

(54) VEHICLE SEAT AND ADJUSTMENT METHOD FOR PAD VIBRATION CHARACTERISTIC

(71) Applicant: BRIDGESTONE CORPORATION, Chuo-ku Tokyo (JP)

(72) Inventors: Yoshiyuki Takahashi, Tokyo (JP); Taisuke Yonezawa, Tokyo (JP); Yukiko Tsugawa, Tokyo (JP)

(73) Assignee: BRIDGESTONE CORPORATION, Chuo-ku Tokyo (JP)

( * ) Notice: Subject to any disclaimer, the term of this patent is extended or adjusted under 35 U.S.C. 154(b) by 0 days.

(21) Appl. No.: 16/771,684

(22) PCT Filed: Oct. 18, 2018

(86) PCT No.: PCT/JP2018/038888
§ 371 (c)(1),
(2) Date: Jun. 11, 2020

(87) PCT Pub. No.: WO2019/116723
PCT Pub. Date: Jun. 20, 2019

(65) Prior Publication Data
US 2021/0070204 A1 Mar. 11, 2021

(30) Foreign Application Priority Data
Dec. 14, 2017 (JP) .............................. JP2017-239738

(51) Int. Cl.
*B60N 2/72* (2006.01)
*A47C 27/14* (2006.01)
*B60N 2/64* (2006.01)

(52) U.S. Cl.
CPC ................ *B60N 2/72* (2013.01); *A47C 27/14* (2013.01); *B60N 2/646* (2013.01)

(58) Field of Classification Search
CPC .......... B60N 2/72; B60N 2/646; A47C 27/14; A47C 27/16; A47C 27/18
USPC ...................................... 297/452.48, 452.56
See application file for complete search history.

(56) References Cited

U.S. PATENT DOCUMENTS 9,738,192 B2 * 8/2017 Hirata .................. B60N 2/3097
10,173,566 B2 * 1/2019 Yonezawa ................ A47C 7/20
(Continued)

FOREIGN PATENT DOCUMENTS

DE 102008028791 A1 12/2009
JP S5915349 U 1/1984
(Continued)

OTHER PUBLICATIONS

Dec. 25, 2018, International Search Report issued in the International Patent Application No. PCT/JP2018/038888.
(Continued)

*Primary Examiner* — Mark R Wendell
(74) *Attorney, Agent, or Firm* — Kenja IP Law PC

(57) ABSTRACT

A vehicle seat according to the present disclosure includes a pad including a foam, and a volume adjustment mechanism that allows adjustment of a volume of the foam. An adjustment method for a pad vibration characteristic according to the present disclosure adjusts a volume of a foam included in a pad to adjust a vibration characteristic of the pad.

19 Claims, 8 Drawing Sheets

(56) References Cited

U.S. PATENT DOCUMENTS

| | | | | |
|---|---|---|---|---|
| 10,532,678 | B2* | 1/2020 | Kumagai | ................. B60N 2/90 |
| 10,549,666 | B2* | 2/2020 | Takahashi | ............ B60N 2/7035 |
| 10,561,246 | B2* | 2/2020 | Kumagai | ................. B60N 2/90 |
| 10,660,444 | B2* | 5/2020 | Kumagai | ............. B60N 2/7094 |
| 10,743,669 | B2* | 8/2020 | Kumagai | ................ A47C 27/14 |
| 10,919,424 | B2* | 2/2021 | Takahashi | ............... B29C 44/08 |
| 10,960,796 | B2* | 3/2021 | Tsugawa | .............. B60N 2/5664 |
| 2014/0333107 | A1 | 11/2014 | Kunio et al. | |
| 2015/0145303 | A1* | 5/2015 | Line | ......................... B60N 2/02 |
| | | | | 297/283.3 |
| 2015/0210192 | A1* | 7/2015 | Benson | .................. B60N 2/525 |
| | | | | 297/217.2 |
| 2021/0086677 | A1* | 3/2021 | Takahashi | ................ B60N 2/72 |

FOREIGN PATENT DOCUMENTS

| | | |
|---|---|---|
| JP | S6122501 Y2 | 7/1986 |
| JP | H05176823 A | 7/1993 |
| JP | 2003259933 A | 9/2003 |
| JP | 2006142937 A | 6/2006 |
| JP | 2013124033 A | 6/2013 |
| JP | 2014118101 A | 6/2014 |
| WO | 2012011453 A1 | 1/2012 |

OTHER PUBLICATIONS

Jun. 16, 2020, International Preliminary Report on Patentability issued in the International Patent Application No. PCT/JP2018/038888.

* cited by examiner

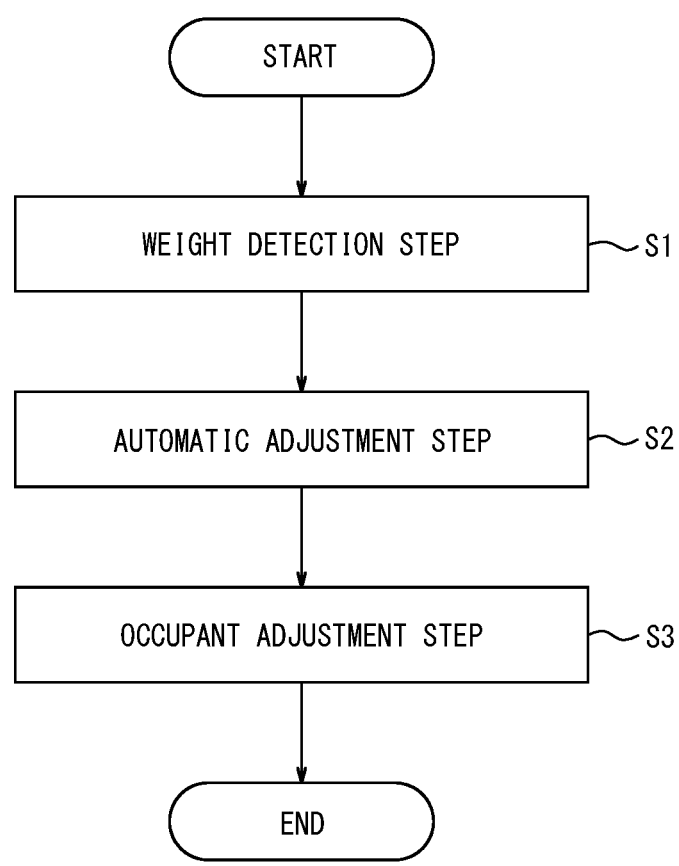

VEHICLE SEAT AND ADJUSTMENT METHOD FOR PAD VIBRATION CHARACTERISTIC

TECHNICAL FIELD

The present disclosure relates to a vehicle seat and an adjustment method for a pad vibration characteristic.

BACKGROUND

There are a variety of types of ordinary automobiles, such as those oriented to comfortability and those oriented to off-road driving. Accordingly, automobile seats are designed to achieve vibration characteristics suitable for the type of automobile by, for example, using a pad material having a different cushioning property, such as a foam.

Conventionally, vibration characteristics of vehicle seats have been adjusted by manipulation of characteristics of springs or pad materials that are components of the seats. That is, such adjustment has been made by using springs or pad materials having material characteristics and structural characteristics with which vibration characteristics suitable for the type of automobile can be achieved. Patent Literature 1 discloses, as a pad material used at the time of the above adjustment, a seat pad material having a resonance frequency of 3.6 Hz or less, a resonance magnification of 3.0 or less, a vibration magnification at 6.0 Hz of 0.9 or less, a core density of 48 $kg/m^3$ or more and 60 $kg/m^3$ or less, an air permeability of 30 $ml/cm^2/s$ or less, and a modulus of repulsion elasticity of 65±5%.

CITATION LIST

Patent Literature

PTL 1: Japanese Patent Laid-Open No. 2003-259933

SUMMARY

Technical Problem

However, in the above-described adjustment method, once a spring or a pad material is determined, vibration characteristics of the seat are also determined; accordingly, vibration characteristics cannot be adjusted according to, for example, a difference in weight of the occupant or an individual difference in personal preference or the like. Furthermore, the above-described adjustment method has difficulty in finely adjusting vibration characteristics during manufacture without employing another spring or pad material having different characteristics.

Furthermore, although in the seat pad material disclosed in Patent Literature 1, the air permeability of urethane foam is set so that the vibration transmissibility (resonance magnification) as one of the vibration characteristics is adjusted, the resonance frequency as one of the vibration characteristics is not adjusted thereby.

An object of the present disclosure is to provide a vehicle seat and an adjustment method for a pad vibration characteristic, in which a resonance frequency of a pad can be adjusted without changing the pad itself.

Solution to Problem

A vehicle seat as the first aspect of the present disclosure includes a pad including a foam, and a volume adjustment mechanism that allows adjustment of a volume of the foam.

An adjustment method for a pad vibration characteristic as the second aspect of the present disclosure adjusts a volume of a foam included in a pad to adjust a vibration characteristic of the pad.

Advantageous Effect

According to the present disclosure, there are provided the vehicle seat and the adjustment method for a pad vibration characteristic, in which a resonance frequency of the pad can be adjusted without changing the pad itself.

BRIEF DESCRIPTION OF THE DRAWINGS

In the accompanying drawings:

FIG. 8 is a flowchart illustrating an example of a control flow executed by the vehicle seat illustrated in FIG. 1.

DETAILED DESCRIPTION

Figure 1:
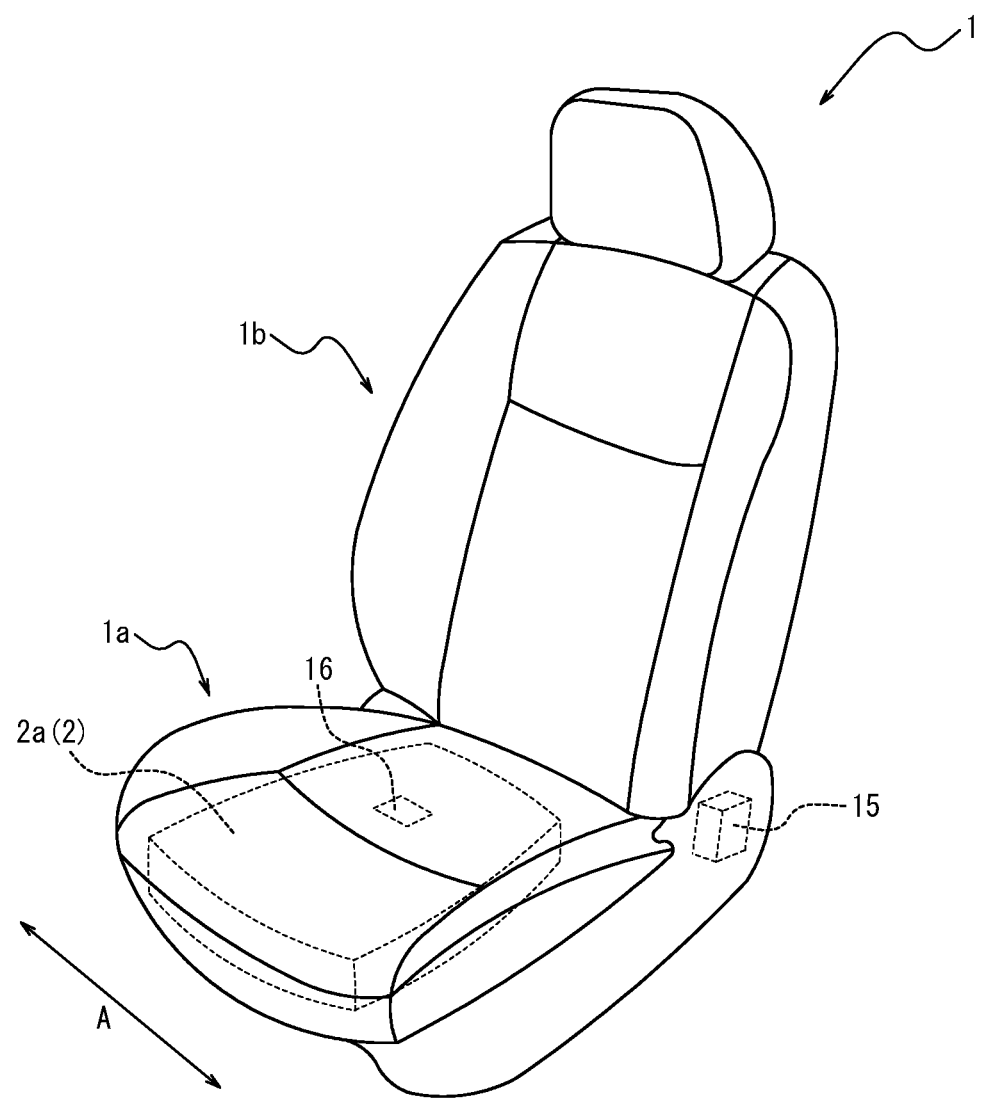
FIG. 1 is a perspective view illustrating a vehicle seat as an embodiment of the present disclosure.

Hereinafter, an embodiment for a vehicle seat and an adjustment method for a pad vibration characteristic according to the present disclosure will be explained with reference to FIGS. 1 to 8. Members and portions common between the figures have the same reference numerals.

Figure 2:
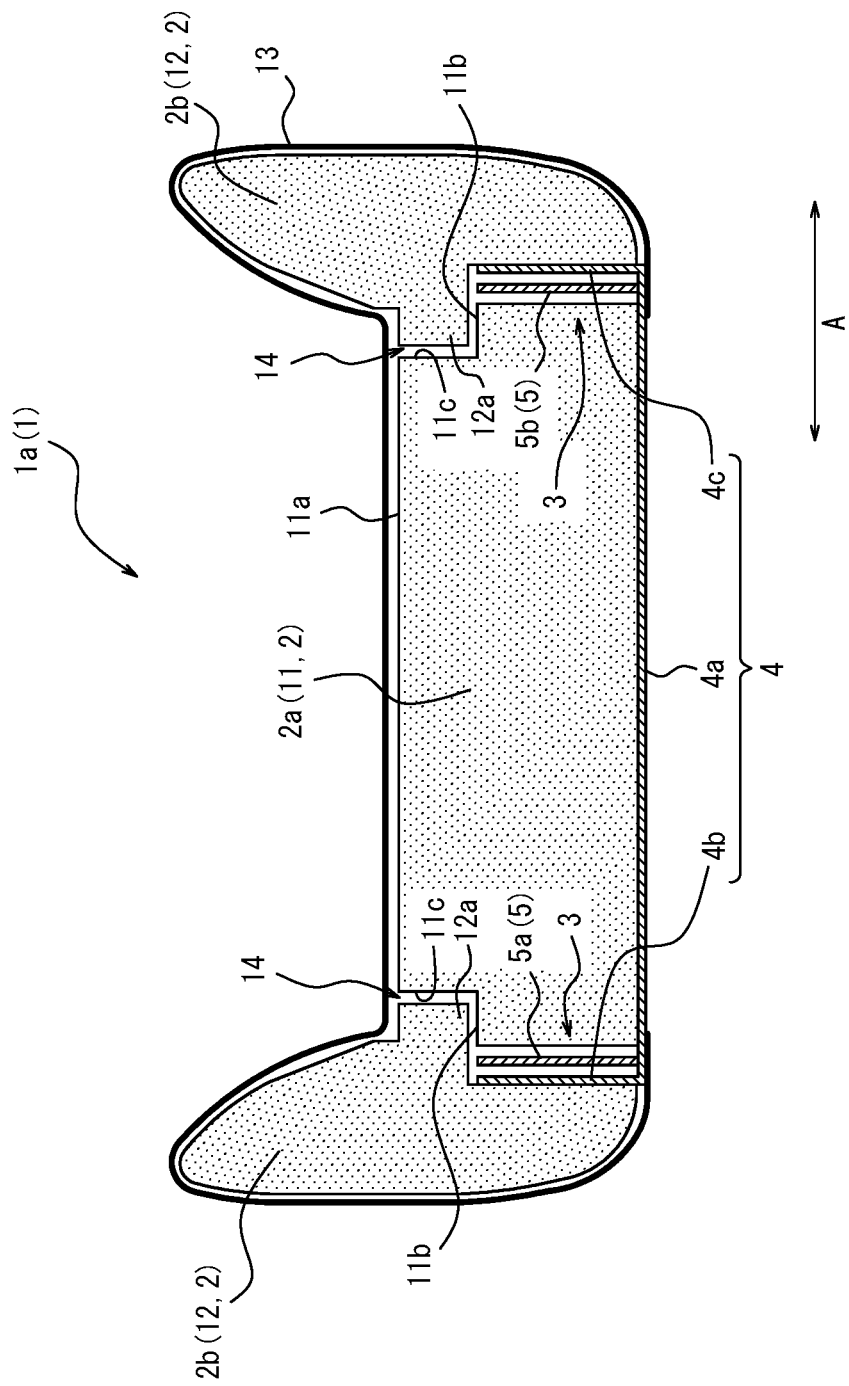
FIG. 2 is a vertical cross-sectional view of a seating portion of the vehicle seat illustrated in FIG. 1 and illustrates a state where a foam is not compressed by a volume adjustment mechanism.
Figure 3:
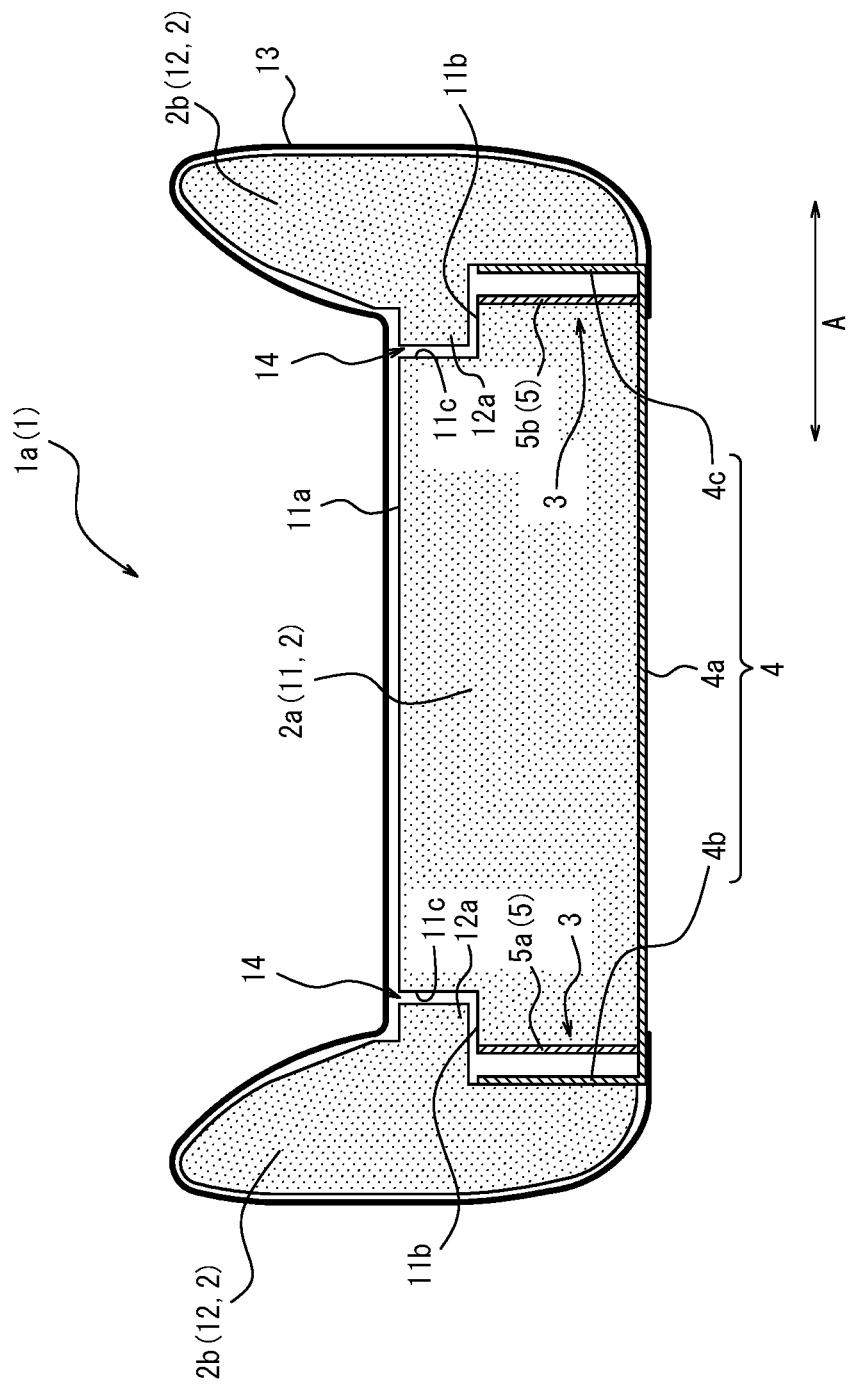
FIG. 3 is a cross-sectional view identical to that of FIG. 2 and illustrates a state where the foam is compressed by the volume adjustment mechanism.

FIG. 1 is a view illustrating a vehicle seat 1 as an embodiment of the vehicle seat according to the present disclosure. FIGS. 2 and 3 are vertical cross-sectional views of a seating portion 1a of the vehicle seat 1.

As illustrated in FIGS. 1 to 3, the vehicle seat 1 includes a pad 2 including a foam 2a, and a volume adjustment mechanism 3 that allows adjustment of a volume of the foam 2a.

The volume adjustment mechanism 3 adjusts the volume of the foam 2a of the pad 2, enabling to change a static spring constant of the foam 2a and consequently a dynamic spring constant thereof. This can change and adjust a resonance frequency as one of vibration characteristics of the pad.

FIG. 3 illustrates a more compressed state of the foam 2a of the pad 2 by the volume adjustment mechanism 3 than a natural state thereof illustrated in FIG. 2. As illustrated in FIG. 3, compressing the foam 2a of the pad 2 can increase the static spring constant of the foam 2a and consequently the dynamic spring constant thereof. This allows the resonance frequency to move to the high frequency side compared with a case where the foam 2a is not compressed by the volume adjustment mechanism 3. Conversely, decompressing the foam 2a of the pad 2 can reduce the static spring constant of the foam 2a and consequently the dynamic spring constant thereof. This allows the resonance frequency to move to the low frequency side compared with a case where the foam 2a is compressed by the volume adjustment mechanism 3.

Hereinafter, further details of the vehicle seat 1 of the present embodiment will be explained.

The vehicle seat 1 of the present embodiment includes a seat pad. As illustrated in FIG. 1, the vehicle seat 1 of the present embodiment includes the seating portion 1a including a cushion pad, and a backrest portion 1b including a back pad. The seat pad is configured to include the above-described cushion pad and back pad. An occupant is seated on an upper surface positioned above the seating portion 1a in the vertical direction. The seating portion 1a supports the seated occupant from below in the vertical direction. Furthermore, the occupant can lean on the backrest portion 1b in a state of being seated on the seating portion 1a. That is, the backrest portion 1b is capable of supporting the back of the occupant seated on the seating portion 1a.

As illustrated in FIGS. 2 and 3, the vehicle seat 1 of the present embodiment includes, in addition to the seat pad as the above-described pad 2, a frame 4 and a pressing member 5. As detailed below, the pressing member 5 includes the above-described volume adjustment mechanism 3.

The pad 2 of the present embodiment is the above-described seat pad, more specifically, the cushion pad on which the occupant is seated. The pad 2 of the present embodiment includes a main pad member 11, a side pad member 12, and a cover member 13 covering the main pad member 11 and the side pad member 12.

The main pad member 11 is disposed at a center position of the seating portion 1a when the seating portion 1a is viewed from above in the vertical direction. That is, the main pad member 11 is disposed so as to be positioned below the seated occupant in the vertical direction. The main pad member 11 is formed of a soft foamed synthetic resin as the foam 2a. More specifically, the foam 2a of the present embodiment is polyurethane foam.

As illustrated in FIGS. 2 and 3, the foam 2a constituting the main pad member 11 of the present embodiment has a flat shape, and a thickness direction of the foam 2a substantially coincides with the vertical direction. Furthermore, the foam 2a of the present embodiment has a substantially rectangular outer shape when viewed from above or below in the vertical direction (see FIG. 1).

More specifically, an upper surface of the foam 2a constituting the main pad member 11 of the present embodiment includes a center portion 11a in a left-right direction A that is positioned above in the vertical direction relative to an end portion 11b on each of the left and right sides. The center portion 11a and end portion 11b of the present embodiment are both substantially horizontal planes, and the center portion 11a and the end portion 11b are continuous with each other via a stepped portion 11c that is a vertical surface extending in the vertical direction. In other words, the main pad member 11 includes the center portion 11a, the end portion 11b, and the stepped portion 11c so as to form a notch circumferential periphery portion 14. "Left-right" means the left-right direction A when the vehicle seat 1 is viewed from the front side so as to face the backrest portion 1b with the seating portion 1a interposed therebetween.

The side pad member 12 is disposed at each of positions of outer peripheral portions on the left and right sides of the seating portion 1a. That is, the side pad member 12 is disposed adjacent to each of the left and right sides of the main pad member 11. The side pad member 12 is formed of a soft foamed synthetic resin as a foam 2b. More specifically, the foam 2b of the present embodiment is polyurethane foam similarly to the foam 2a.

As illustrated in FIGS. 2 and 3, the foam 2b constituting the side pad member 12 of the present embodiment has a thickness in the vertical direction that is thicker than that of the foam 2a constituting the main pad member 11. The foam 2b constituting the side pad member 12 of the present embodiment is disposed on each of the left and right sides of the foam 2a constituting the main pad member 11 so as to protrude above in the vertical direction relative to the foam 2a. Providing this side pad member 12 allows the occupant seated at a position above the main pad member 11 in the vertical direction to be prevented from moving side to side by an inertial force or the like, enhancing a positional stability when the occupant is seated.

As illustrated in FIGS. 2 and 3, the foam 2b constituting the side pad member 12 of the present embodiment is provided with a coating portion 12a that enters the above-described notch circumferential periphery portion 14 of the foam 2a constituting the main pad member 11. The coating portion 12a is disposed at a position vertically overlapping with the end portion 11b on an upper surface of the main pad member 11. Accordingly, even when the pressing member 5, which will be described later, moves in the left-right direction A, the coating portion 12a hardly allows the pressing member 5 to be exposed. This can prevent a dangerous movement in which the occupant accidentally inserts his or her hand between the pressing member 5 and the frame 4, which will be described later. Furthermore, a gap is hardly formed between the side pad member 12 and the main pad member 11, enabling to prevent decrease of seating comfortability due to the gap.

The cover member 13 covers the main pad member 11 and the side pad member 12. The cover member 13 can be formed of a material having an air permeability, for example, such as cloth or leather.

The frame 4 supports the pad 2. Specifically, the frame 4 of the present embodiment includes a frame body portion 4a supporting the main pad member 11 from below in the vertical direction, and a left frame side wall portion 4b and a right frame side wall portion 4c protruding above in the vertical direction from opposite left and right end portions of the frame body portion 4a to support the side pad member 12. The frame 4 can be formed of, for example, steel.

As illustrated in FIGS. 2 and 3, the frame body portion 4a of the present embodiment is formed of a steel sheet. Furthermore, the left frame side wall portion 4b and the right frame side wall portion 4c of the present embodiment are formed of a steel sheet similarly to the frame body portion 4a and protrude above in the vertical direction from the respective left and right sides of the frame body portion 4a. The frame body portion 4a, the left frame side wall portion 4b, and the right frame side wall portion 4c may be integrally formed or may be separately formed and then integrally bonded together.

The foam 2a constituting the main pad member 11 is disposed on an upper surface of the frame body portion 4a at a position between the left frame side wall portion 4b and the right frame side wall portion 4c. The foam 2b constituting the side pad member 12 is attached to each of the left frame side wall portion 4b and the right frame side wall portion 4c.

The pressing member 5 is attached so as to be movable with respect to the frame 4. Specifically, the pressing member 5 of the present embodiment is attached so as to be movable in the left-right direction A with respect to the frame body portion 4a at the position between the left frame side wall portion 4b and the right frame side wall portion 4c.

More specifically, the pressing member 5 of the present embodiment includes a first pressing piece 5a and a second pressing piece 5b disposed on the respective left and right sides of the main pad member 11. The first pressing piece 5a is disposed on the left side of the main pad member 11 so as to be positioned between the main pad member 11 and the left frame side wall portion 4b. The second pressing piece 5b is disposed on the right side of the main pad member 11 so as to be positioned between the main pad member 11 and the right frame side wall portion 4c. In other words, in the main pad member 11, the left and right sides are interposed between the first pressing piece 5a and the second pressing piece 5b. In the first pressing piece 5a and the second pressing piece 5b, the left and right sides are interposed between the left frame side wall portion 4b and the right frame side wall portion 4c.

The first pressing piece 5a and the second pressing piece 5b are movable in the left-right direction A, and a facing distance between each other is changed, enabling to adjust a compressed state of the foam 2a constituting the main pad member 11 in the left-right direction A. Furthermore, the first pressing piece 5a and the second pressing piece 5b can be fixed in position in the left-right direction A. Accordingly, the first pressing piece 5a and the second pressing piece 5b are fixed in position in the left-right direction A, enabling to hold the compressed state of the foam 2a in the left-right direction A. Moving mechanisms of the first pressing piece 5a and the second pressing piece 5b of the pressing member 5 are not particularly limited, and various moving mechanisms can be used, including, for example, a mechanism of using a ball screw. Furthermore, although in the present embodiment, the first pressing piece 5a and the second pressing piece 5b are provided on the respective sides of the main pad member 11 in the left-right direction A, only either one of the first pressing piece 5a and the second pressing piece 5b may be provided thereon. In such a case, the main pad member 11 may be compressed in the left-right direction A between either one of the first pressing piece 5a and the second pressing piece 5b and the right frame side wall portion 4c or the left frame side wall portion 4b positioned on the opposite side with the main pad member 11 interposed therebetween.

In this way, the volume adjustment mechanism 3 of the present embodiment includes the pressing member 5 attached so as to be movable with respect to the frame 4. The pressing member 5 moves with respect to the frame 4 and presses the foam 2a, enabling to compress the foam 2a. Using this pressing member 5 can achieve the volume adjustment mechanism 3 with a simple configuration.

Here, the volume adjustment mechanism 3 of the present embodiment allows adjustment of the volume of the foam 2a within a predetermined range of the volume in terms of ratio with respect to that in the natural state. In such a case where the compressed state of the foam 2a can be adjusted within a predetermined range, the static and dynamic spring constants of the foam 2a can be optionally adjusted within a certain range. This can achieve a configuration in which the resonance frequency of the foam 2a can be optionally adjusted within a certain range.

Note that the adjustment timing of the volume of the foam 2a by the volume adjustment mechanism 3 is not particularly limited. That is, the adjustment may be made during manufacture of the vehicle seat 1 or may be made by the occupant during use. Examples of the adjustment during manufacture include a fine adjustment for obtaining a desired pad vibration characteristic. Furthermore, for the adjustment during use, there are various adjustments, including, for example, a manual or electric adjustment carried out by the occupant himself or herself according to his or her personal preference, and an adjustment in which a controller 15 and a load sensor 16, which will be described later, automatically control the compressed state so as to achieve a constant pad vibration characteristic according to the weight of the occupant (see FIGS. 1 and 8).

Furthermore, although the present embodiment provides an example in which the foam 2a is changed from the natural state (see FIG. 2) to the compressed state (see FIG. 3), and thereby the static and dynamic spring constants of the foam 2a are increased, that is, the resonance frequency is moved to the high frequency side, the present embodiment is not limited to this configuration. For example, the foam 2a is brought into a different compressed state, and thereby the static and dynamic spring constants of the foam 2a may be changed. Specifically, a configuration is provided in which, as a compressed state of the foam 2a, three or more compressed states having different amounts of compression can be achieved. For example, a configuration is provided in which three compressed states, a first compressed state, a second compressed state having an amount of compression that is smaller than that of the first compressed state, and a third compressed state having an amount of compression that is even smaller than that of the second compressed state, can be achieved. This enables, for example, an adjustment for increasing the static and dynamic spring constants by changing from the second compressed state to the first compressed state. Furthermore, an adjustment for reducing the static and dynamic spring constants by changing from the second compressed state to the third compressed state is also possible. Furthermore, the foam 2a is extended from the natural state, and thereby the static and dynamic spring constants of the foam 2a may be changed. Note that, as in the present embodiment, the spring constants are preferably changed by the use of compression of the foam 2a.

Furthermore, as illustrated in FIGS. 2 and 3, although the volume adjustment mechanism 3 of the present embodiment compresses the foam 2a in the left-right direction A, which is one of the horizontal directions, the compression direction is not limited to the horizontal direction, and the vertical direction may be used for the compression direction. Furthermore, compression may be made in both of the horizontal direction and the vertical direction. In such a case where a configuration is provided in which the volume adjustment mechanism 3 is capable of compressing the foam 2a in at least one of the horizontal direction and the vertical direction, the resonance frequency of the pad 2 can be easily adjusted. Note that, as in the present embodiment, the foam 2a is preferably compressed by the volume adjustment mechanism 3 in the horizontal direction. This facilitates further simplification of a configuration of the volume adjustment mechanism 3 when the volume adjustment mechanism 3 is used with respect to the cushion pad as the pad 2 of the vehicle seat 1.

Figure 4:
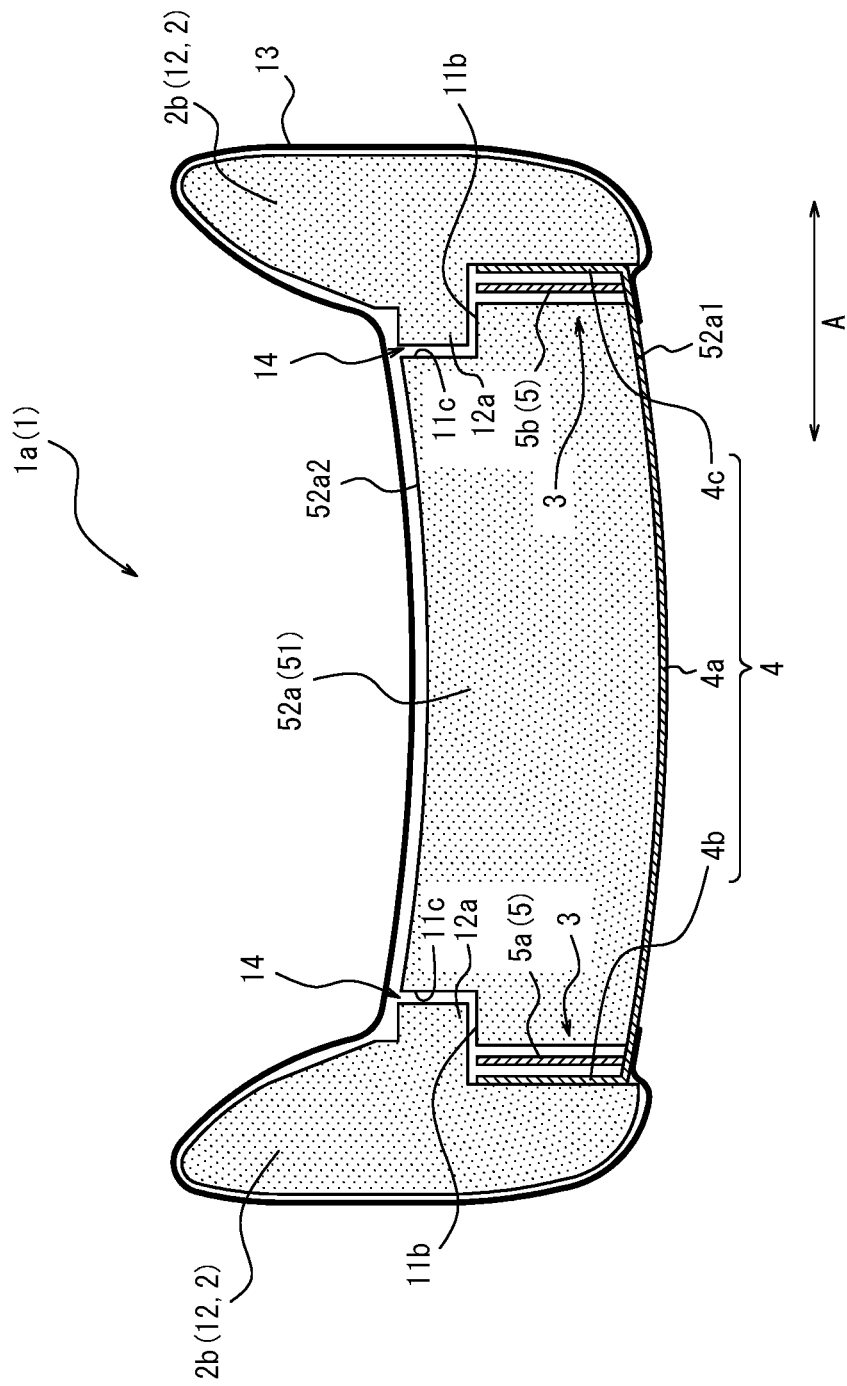
FIG. 4 is a view illustrating a modified example of a main pad member illustrated in FIG. 2.

Moreover, a surface of the foam 2a positioned on at least one side in the vertical direction preferably has a raised shape. FIG. 4 is a view illustrating a main pad member 51 as a modified example of the main pad member 11. The main pad member 51 illustrated in FIG. 4 includes a foam 52a. The foam 52a is polyurethane foam similarly to the foam 2a.

A lower surface that is a vertically lower surface of the foam 52a illustrated in FIG. 4 has a raised shape, and an upper surface that is a vertically upper surface thereof has a recessed shape. More specifically, in the example illustrated in FIG. 4, the lower surface of the foam 52a includes such a raised curved surface 52a1 as to have an apex at the center position in the left-right direction A. Furthermore, the upper surface of the foam 52a includes such a recessed curved surface 52a2 as to have a bottom at the center position in the left-right direction A. Accordingly, when the foam 52a illustrated in FIG. 4 is compressed from the left and right sides, in the foam 52a, the center position in the left-right direction A is easily deformed so as to buckle below in the vertical direction. In other words, the foam 52a has the lower surface formed in a raised shape and the upper surface formed in a recessed shape, and thereby the buckling direction during compression in the left-right direction A is previously shaped. In such a case where a shape that facilitates buckling in a predetermined direction is provided, buckling in an unintended direction other than a predetermined direction can be prevented, and providing a mechanism of preventing buckling in a predetermined direction allows buckling in a predetermined direction to be easily dealt with.

In the example illustrated in FIG. 4, as described above, the center position of the foam 52a in the left-right direction A easily buckles below in the vertical direction during compression from the left and right sides. This can prevent buckling in an unintended direction, for example, buckling above in the vertical direction. Furthermore, in the example illustrated in FIG. 4, the foam 52a is supported from below in the vertical direction by the frame body portion 4a of the frame 4. Then, even if the center position of the foam 52a in the left-right direction A is made to be deformed to buckle below, the frame body portion 4a prevents the deformation. That is, the frame body portion 4a can prevent buckling deformation of the foam 52a. That is, providing the frame body portion 4a can easily prevent buckling below in the vertical direction. Although the shape of the frame body portion 4a is not particularly limited if the foam 52a can be supported and buckling deformation of the foam 52a is prevented, as in the frame body portion 4a illustrated in FIG. 4, an upper surface of the frame body portion 4a preferably includes a recessed curved surface corresponding to the raised curved surface 52a1 of the foam 52a.

Figure 5:
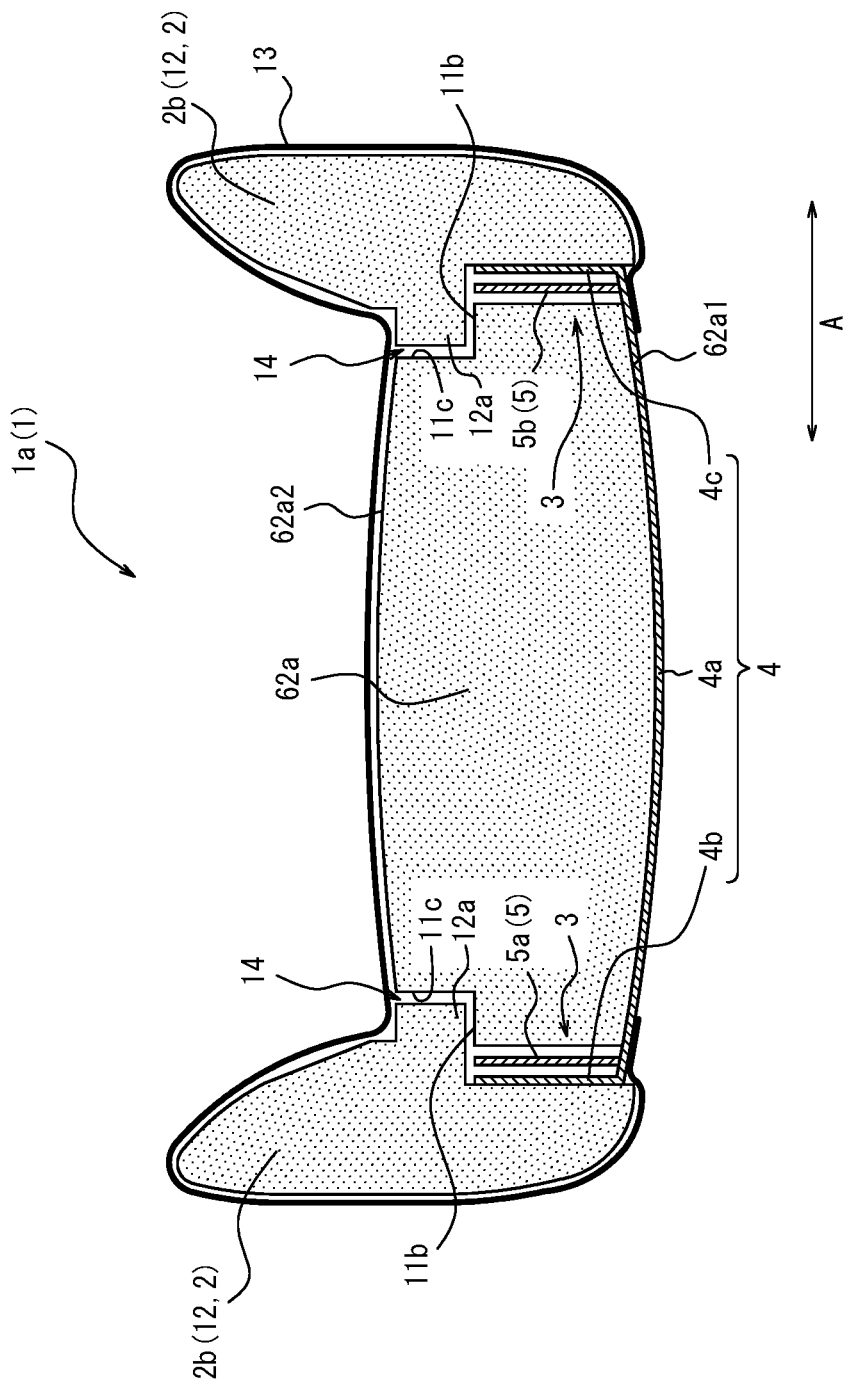
FIG. 5 is a view illustrating another modified example of the main pad member illustrated in FIG. 2.

Although FIG. 4 illustrates an example in which the lower surface of the foam 52a is formed in a raised shape, and the upper surface thereof is formed in a recessed shape, as in a foam 62a as another modified example illustrated in FIG. 5, the lower surface and the upper surface may be formed in a raised shape. Specifically, in the example illustrated in FIG. 5, a lower surface of the foam 62a includes such a raised curved surface 62a1 as to have an apex at the center position in the left-right direction A. Furthermore, an upper surface of the foam 62a also includes such a raised curved surface 62a2 as to have an apex at the center position in the left-right direction A. This can prevent the foam 62a compressed from the left and right sides from buckling above and below in the vertical direction compared with a configuration in which the upper and lower surfaces of the foam are both formed only of horizontal surfaces.

In such a case where the foam is compressed in the left-right direction A, a surface positioned on at least either side of the foam in the vertical direction preferably has a raised shape. This can achieve, as in the above-described foam 52a (see FIG. 4) and foam 62a (see FIG. 5), a configuration in which buckling deformation is easily prevented (see FIG. 4) or in which buckling itself hardly occurs (see FIG. 5) even when compression is made in the left-right direction A.

Although the above-described foams 2a, 52a, and 62a are all configured to be compressed in the left-right direction A, which is one of the horizontal directions, and have a raised shape on the surface positioned in the vertical direction orthogonal to the left-right direction A, not limited to this configuration, the foams 2a, 52a, and 62a may be configured to be compressed in the vertical direction and also may have a raised shape on the surface on at least either side in the horizontal direction. Note that a configuration is particularly preferable in which, as in the foam 52a illustrated in FIG. 4, compression is made from the left-right direction A, the lower surface in the vertical direction is formed in a raised shape, and the upper surface in the vertical direction is formed in a recessed shape. As described above, this can facilitate prevention of buckling deformation and further enhance a positional stability of the occupant seated on the upper surface in the vertical direction.

Next, a specific example of the volume adjustment of the foam 2a by the volume adjustment mechanism 3 of the present embodiment will be explained. As described above, the volume adjustment mechanism 3 of the present embodiment allows adjustment of the volume of the foam 2a within a predetermined range of the volume in terms of ratio with respect to that in the natural state. More specifically, the volume adjustment mechanism 3 of the present embodiment is capable of compressing the foam 2a, and the above-described predetermined range is preferably set within a range of 40 to 99% and more preferably set within a range of 70 to 99%. In other words, lower and upper limit values of the above-described predetermined range are preferably set within the above numerical range. The compressed state of the foam 2a is adjusted in a predetermined range within the above numerical range, and thereby the resonance frequency of the foam 2a can be adjusted while a vibration transmissibility of the foam 2a is prevented from changing. Hereinafter, a relationship between the resonance frequency and the vibration transmissibility of the foam 2a will be explained.

Figure 6:
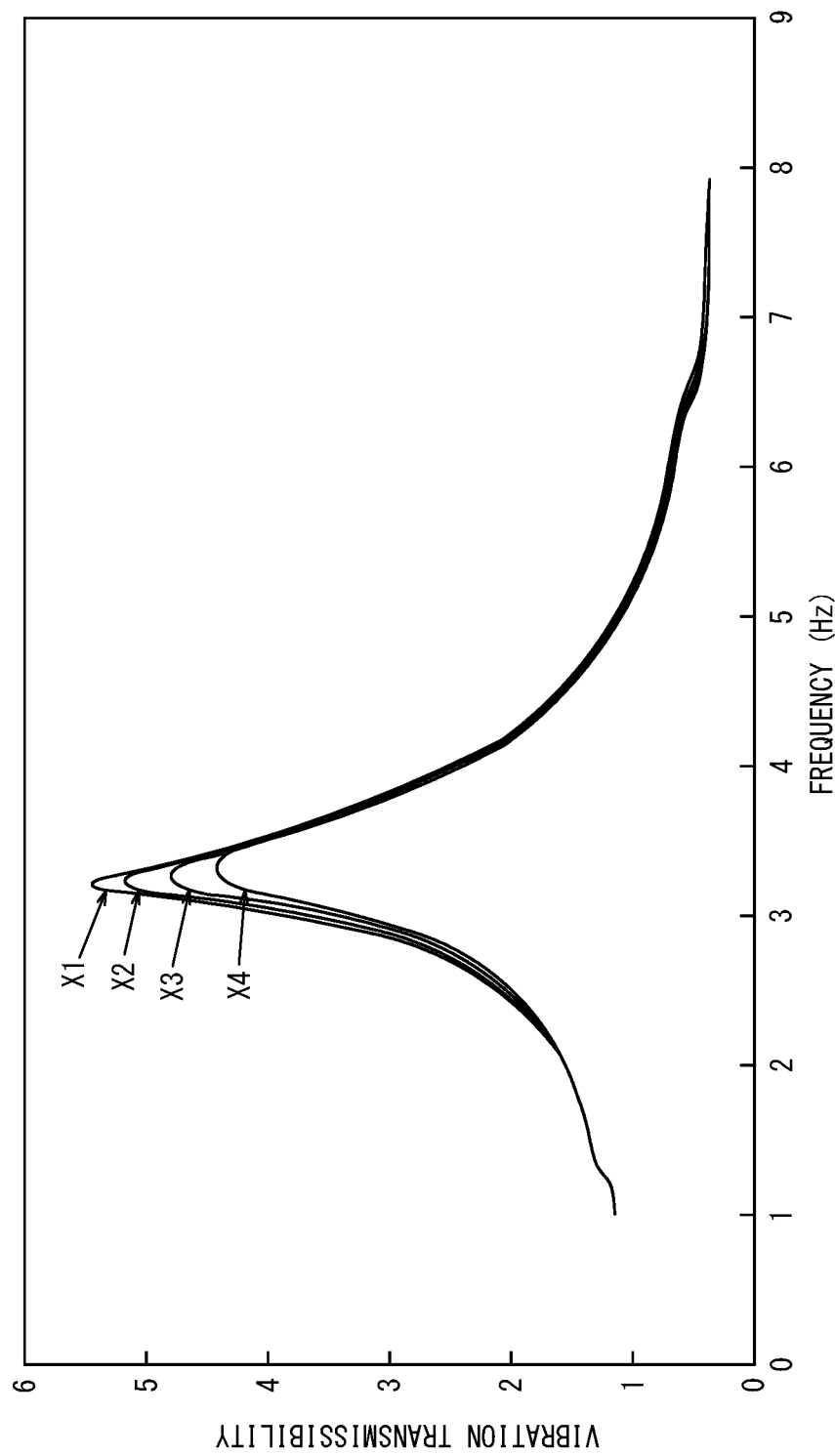
FIG. 6 is a graph illustrating a relationship between an air permeability and a vibration transmissibility in polyurethane foam.

FIG. 6 is a graph illustrating a relationship between an air permeability and a vibration transmissibility in polyurethane foam. Four graphs illustrated in FIG. 6 illustrate resonance frequencies and vibration transmissibilities in polyurethane foams having different air permeabilities. A frequency presenting a peak in each graph is a resonance frequency.

Specifically, "X1" in FIG. 6 is polyurethane foam having the highest air permeability. Then, the air permeability decreases in order of "X2," "X3," and "X4" in FIG. 6. It can be understood that, as illustrated in FIG. 6, changing the air permeability of polyurethane foam can change the vibration transmissibility. Specifically, it can be understood that the smaller the air permeability, the smaller the vibration transmissibility. Furthermore, it can be understood that, as illustrated in FIG. 6, even changing the air permeability of polyurethane foam hardly changes the resonance frequency.

Figure 7:
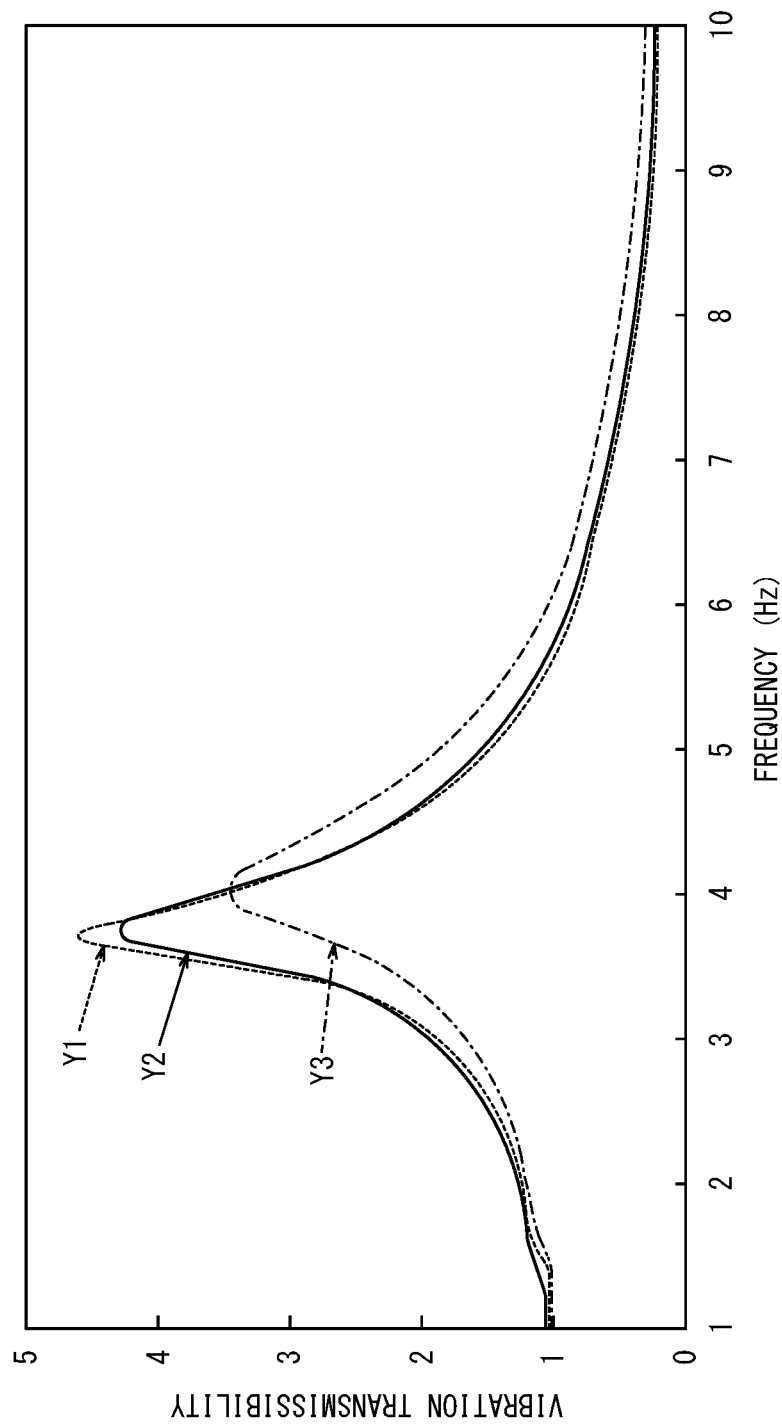
FIG. 7 is a graph illustrating a relationship between a hardness and a resonance frequency in polyurethane foam.

FIG. 7 is a graph illustrating a relationship between a hardness and a resonance frequency in polyurethane foam. Three graphs illustrated in FIG. 7 illustrate resonance frequencies and vibration transmissibilities in polyurethane foams having different hardnesses. Specifically, "Y1" in FIG. 7 is polyurethane foam having the highest hardness. Then, the hardness decreases in order of "Y2" and "Y3" in FIG. 7. It can be understood that, as illustrated in FIG. 7, changing the hardness of polyurethane foam can change the resonance frequency. However, it can be understood that, as illustrated in FIG. 7, changing the hardness of polyurethane foam greatly changes not only the resonance frequency but also the vibration transmissibility.

That is, adjusting the air permeability of the foam or using a foam having a different hardness cannot change the resonance frequency while preventing the vibration transmissibility from changing (see FIGS. 6 and 7).

The present inventors have obtained knowledge to the effect that the vibration transmissibility and the resonance frequency are allowed to be controlled separately, and thereby each of the vibration transmissibility and the resonance frequency can be easily adjusted according to individual differences or the like. Then, as a result of repeated earnest studies, the present inventors have obtained knowledge to the effect that changing the volume of the foam within the predetermined range by volume ratio to the natural state makes it possible to change the resonance frequency while the vibration transmissibility is prevented from changing.

As illustrated in FIG. 6, the vibration transmissibility of the foam 2a is known to be greatly affected by the air permeability of the foam 2a and greatly change according to changes in the air permeability. Accordingly, reducing changes in the air permeability can change the resonance frequency while preventing the vibration transmissibility from changing. Since bubbles of the foam 2a are crushed by compression deformation of the foam 2a, applying the weight of the occupant (for example, 50 kg) decreases the air permeability of the foam 2a. However, it is considered that even if the compressed state of the foam 2a is further changed in a state where the weight of the occupant (for example, 50 kg) is applied to the foam 2a, if the further change amount of the compressed state is within a predetermined range, the bubbles in the foam 2a are maintained without being further crushed, enabling to achieve a state where the air permeability does not change. Accordingly, using this state where the air permeability does not change can achieve a configuration of changing the resonance frequency while preventing the vibration transmissibility from changing.

In the vehicle seat 1 of the present embodiment, to use the state where the bubbles of the above-described foam 2a are maintained without being further crushed, the foam 2a is compressed so as to have a volume which is, by volume ratio to the natural state where the weight of the occupant is not applied, within a range of 40 to 99%, more preferably within a range of 70 to 99%. It is not preferable to compress the foam 2a to less than 40% by volume ratio to the natural state since the bubbles are highly likely to be crushed, leading to a decrease in the air permeability and a large decrease in the vibration transmissibility. In other words, the volume adjustment mechanism 3 of the vehicle seat 1 is configured to allow adjustment of the volume of the foam 2a within the above-described range, so that in a state where the weight of the occupant is applied, the adjustment of the resonance frequency can be executed so as to change in a range of 1 to 10 Hz, preferably 2 to 7 Hz, more preferably 3 to 5 Hz, while the vibration transmissibility is prevented from changing.

As above, according to the vehicle seat 1, there is provided the volume adjustment mechanism 3 that allows adjustment of the volume of the foam 2a, and thus the resonance frequency of the foam 2a can be adjusted.

Furthermore, according to the vehicle seat 1 of the present embodiment, the volume of the foam 2a is adjusted within the predetermined range by volume ratio to the natural state, and thus the resonance frequency can be changed while the vibration transmissibility is prevented from changing. This allows the pad vibration characteristic to be easily adjusted according to various conditions during manufacture or use. For example, when the adjustment is made during manufacture, without change in the foam 2a itself, the resonance frequency can be finely adjusted by the use of the same foam 2a.

Furthermore, when the adjustment is made during use, for example, an adjustment for achieving a constant resonance frequency regardless of the weight of the occupant or an adjustment for achieving a resonance frequency according to an individual difference of the occupant can be executed.

Finally, a control flow in which the vehicle seat 1 of the present embodiment automatically adjusts the resonance frequency according to the weight of the occupant will be exemplified and explained. FIG. 8 is an example of the control flow in which the vehicle seat 1 automatically adjusts the resonance frequency according to the weight of the occupant. As illustrated in FIG. 1, the vehicle seat 1 includes the controller 15 and the load sensor 16. The occupant is seated on the seating portion 1a, and thereby the load sensor 16 detects weight information of the occupant (weight detection step S1). Based on the weight information detected by the load sensor 16, the controller 15 drives the volume adjustment mechanism 3, adjusts the volume of the foam 2a, and adjusts the resonance frequency (automatic adjustment step S2). The controller 15 adjusts the volume of the foam 2a so as to obtain, as an example, a resonance frequency that is previously set by the vehicle supplier or the occupant and does not depend on the weight.

As illustrated in FIG. 8, after the controller 15 completes the adjustment of the vibration characteristic, the volume of the foam 2a may be manually or electrically adjusted according to a preference of the occupant (occupant adjustment step S3).

The vehicle seat and the adjustment method for a pad vibration characteristic according to the present disclosure are not limited to a specific configuration and step of the above-described embodiment, and various modifications and alterations may be made without departing from the description of claims. For example, although the pressing member 5 of the above-described volume adjustment mechanism 3 is configured to compress the foam 2a from both sides in the left-right direction A, in addition to or instead of both sides in the left-right direction A, the foam 2a may be compressed from another horizontal direction. Furthermore, although in the above-described embodiment, polyurethane foam is used as the foam 2a, another foam may be used. Note that since polyurethane foam has high versatility, it is preferable that the adjustment of the resonance frequency can be achieved using polyurethane foam. The vehicle seat according to the present disclosure can achieve the above-described adjustment of the resonance frequency using polyurethane foam as the foam.

Furthermore, although the volume adjustment mechanism 3 of the above-described embodiment is configured to include the pressing member 5 that presses the foam 2a, not limited to this configuration, the volume adjustment mechanism 3 may be configured to include, for example, a bag covering the foam 2a, and a suction machine that allows adjustment of an amount of air in this bag.

INDUSTRIAL APPLICABILITY

The present disclosure relates to a vehicle seat and an adjustment method for a pad vibration characteristic.

REFERENCE SIGNS LIST

1 Vehicle seat
1a Seating portion
1b Backrest portion

2 Pad
2a Foam
2b Foam
3 Volume adjustment mechanism
4 Frame
4a Frame body portion
4b Left frame side wall portion
4c Right frame side wall portion
5 Pressing member
5a First pressing piece
5b Second pressing piece
11 Main pad member
11a Center portion
11b End portion
11c Stepped portion
12 Side pad member
12a Coating portion
13 Cover member
14 Notch circumferential periphery portion
15 Controller
16 Load sensor
51 Main pad member
52a Foam
52a1 Lower curved surface
52a2 Upper curved surface
62a Foam
62a1 Lower curved surface
62a2 Upper curved surface
A Left-right direction

The invention claimed is:

1. A vehicle seat comprising:
a pad including a foam; and
a volume adjustment mechanism that allows adjustment of a volume of the foam,
the pad comprising:
 a main pad member including a foam; and
 a side pad member including a foam and disposed adjacent to each of both sides of the main pad member;
wherein the foam of the side pad member has a thickness in a vertical direction larger than a thickness of the foam of the main pad member and protrudes above in the vertical direction relative to the foam of the main pad member;
the volume adjustment mechanism comprises a pressing member being movable in a horizontal direction, and the pressing member moves and presses the foam of the main pad member to thereby be capable of compressing the foam of the main pad member in the horizontal direction;
the pressing member is arranged between the foam of the main pad member and the foam of the side pad member; and
the foam of the side pad member includes a coating portion protruding toward the main pad member so as to cover an upper side of the pressing member and vertically overlapping with an end portion on an upper surface of the foam of the main pad member.

2. The vehicle seat according to claim 1, wherein the volume adjustment mechanism allows adjustment of the volume of the foam of the main pad member within a predetermined range of the volume in terms of ratio with respect to that in a natural state.

3. The vehicle seat according to claim 2, wherein the volume adjustment mechanism is capable of compressing the foam of the main pad member, and the predetermined range is set within a range of 40 to 99% with respect to the volume in the natural state.

4. The vehicle seat according to claim 3, wherein the predetermined range is set within a range of 70 to 99% with respect to the volume in the natural state.

5. The vehicle seat according to claim 4, further comprising a frame supporting the pad,
wherein the pressing member is attached to the frame so as to be movable with respect to the frame in the horizontal direction, and
the pressing member moves with respect to the frame and presses the foam of the main pad member to thereby be capable of compressing the foam of the main pad member.

6. The vehicle seat according to claim 5, wherein the frame comprises a frame body portion supporting the main pad member from below in the vertical direction, and
a lower surface of the foam of the main pad member in the vertical direction is formed in a raised shape and an upper surface of the foam of the main pad member in the vertical direction is formed in a recessed shape.

7. The vehicle seat according to claim 3, further comprising a frame supporting the pad,
wherein the pressing member is attached to the frame so as to be movable with respect to the frame in the horizontal direction, and
the pressing member moves with respect to the frame and presses the foam of the main pad member to thereby be capable of compressing the foam of the main pad member.

8. The vehicle seat according to claim 7, wherein the frame comprises a frame body portion supporting the main pad member from below in the vertical direction, and
a lower surface of the foam of the main pad member in the vertical direction is formed in a raised shape and an upper surface of the foam of the main pad member in the vertical direction is formed in a recessed shape.

9. The vehicle seat according to claim 3, wherein the foam of the main pad member is polyurethane foam.

10. The vehicle seat according to claim 2, further comprising a frame supporting the pad,
wherein the pressing member is attached to the frame so as to be movable with respect to the frame in the horizontal direction, and
the pressing member moves with respect to the frame and presses the foam of the main pad member to thereby be capable of compressing the foam of the main pad member.

11. The vehicle seat according to claim 10, wherein the frame comprises a frame body portion supporting the main pad member from below in the vertical direction, and
a lower surface of the foam of the main pad member in the vertical direction is formed in a raised shape and an upper surface of the foam of the main pad member in the vertical direction is formed in a recessed shape.

12. The vehicle seat according to claim 2, wherein the foam of the main pad member is polyurethane foam.

13. The vehicle seat according to claim 2, wherein a surface of the foam of the main pad member positioned on at least one side in the vertical direction comprises a raised shape.

14. The vehicle seat according to claim 1, wherein a surface of the foam of the main pad member positioned on at least one side in the vertical direction comprises a raised shape.

15. The vehicle seat according to claim 1, further comprising a frame supporting the pad, wherein the pressing member is attached to the frame so as to be movable with respect to the frame in the horizontal direction, and the pressing member moves with respect to the frame and presses the foam of the main pad member to thereby be capable of compressing the foam of the main pad member.

16. The vehicle seat according to claim 15, wherein the foam of the main pad member is polyurethane foam.

17. The vehicle seat according to claim 15, wherein the frame comprises a frame body portion supporting the main pad member from below in the vertical direction, and a lower surface of the foam of the main pad member in the vertical direction is formed in a raised shape and an upper surface of the foam of the main pad member in the vertical direction is formed in a recessed shape.

18. The vehicle seat according to claim 1, wherein the foam of the main pad member is polyurethane foam.

19. The vehicle seat according to claim 1, wherein the foam of the main pad member has a notch portion at the end portion on the upper surface of the foam of the main pad member, and the coating portion of the foam of the side pad member enters the notch portion of the foam of the main pad member.

* * * * *